US006620874B1

(12) United States Patent
Young et al.

(10) Patent No.: US 6,620,874 B1
(45) Date of Patent: Sep. 16, 2003

(54) METHOD OF MAKING IONOMERIC PARTICULATES BY SUSPENSION POLYMERIZATION

(76) Inventors: Chung I. Young, P.O. Box 33427, St. Paul, MN (US) 55133-3427; Michael R. Engel, P.O. Box 33427, St. Paul, MN (US) 55133-3427; Chi-Ming Tseng, P.O. Box 33427, St. Paul, MN (US) 55133-3427

( * ) Notice: Subject to any disclaimer, the term of this patent is extended or adjusted under 35 U.S.C. 154(b) by 0 days.

(21) Appl. No.: 09/441,578

(22) Filed: Nov. 17, 1999

(51) Int. Cl.⁷ .................... C08F 220/06; C08F 222/02; C08F 2/18; C08F 265/00
(52) U.S. Cl. .................... 524/430; 524/433; 524/458; 524/533; 524/535; 524/547; 524/609
(58) Field of Search ................. 524/430, 433, 524/458, 533, 535, 547, 609

(56) References Cited

U.S. PATENT DOCUMENTS

| 4,238,442 A | | 12/1980 | Cline et al. ................. 264/206 |
| 4,833,179 A | | 5/1989 | Young et al. ................ 522/183 |
| 4,950,575 A | * | 8/1990 | Shiozaki et al. ............ 430/110 |
| 4,952,650 A | | 8/1990 | Young et al. ................ 526/194 |
| 5,278,017 A | * | 1/1994 | Tsujihiro .................... 430/110 |
| 5,292,844 A | | 3/1994 | Young et al. ............. 526/329.5 |
| 5,374,698 A | | 12/1994 | Young et al. ................ 526/264 |
| 5,541,031 A | * | 7/1996 | Yamashita et al. .......... 430/109 |
| 5,626,955 A | | 5/1997 | Goetz et al. .............. 428/315.7 |
| 5,696,199 A | | 12/1997 | Senkus et al. .............. 524/548 |
| 5,756,625 A | | 5/1998 | Crandall et al. ............ 526/320 |
| 5,952,420 A | | 9/1999 | Senkus et al. .............. 524/548 |
| 5,962,178 A | | 10/1999 | Cheng ........................ 430/137 |

FOREIGN PATENT DOCUMENTS

| EP | 0 466 212 | | 1/1992 | |
| JP | 07-199536 A | * | 8/1995 | .......... G03G/9/087 |

OTHER PUBLICATIONS

ASTM D-2979-71 (1980).
ASTM D 907-82 (1985).

* cited by examiner

Primary Examiner—Kelechi Egwim
(74) Attorney, Agent, or Firm—Scott R Pribnow

(57) ABSTRACT

A method of making ionomeric particulate compositions by suspension polymerization are provided. The method comprises the steps of (a) forming an aqueous phase comprising an acid monomer, a metal oxide, and at least a first and a second surfactant, the first being a monomer surfactant; (b) forming an oil phase comprising at least one vinyl monomer; and (c) suspension polymerizing the aqueous phase with the oil phase to yield an ionomeric particulate composition. The resulting particulates do not have pressure sensitive tack. Particle size in the range of less than 10 micrometers can be made. The ionomeric particulate is made in the absence of a chain transfer agent and thus can have high molecular weight.

14 Claims, No Drawings

_US 6,620,874 B1_

METHOD OF MAKING IONOMERIC PARTICULATES BY SUSPENSION POLYMERIZATION

TECHNICAL FIELD

This invention relates to a method of making ionomeric particulate compositions that are useful for modifying the rheology, functionality, and physical properties of a polymer matrix so as to render the matrix more useful in applications that require adhesive properties.

BACKGROUND

Suspension polymerization has been used to make polymer beads. For example, U.S. Pat. Nos. 4,833,179 (Young et al.) and 4,952,650 (Young et al.) describe methods of aqueous suspension polymerization to form pressure sensitive acrylate copolymer beads. The methods generally comprise making a monomer premix comprising acrylic acid esters of a non-tertiary alcohol, an acid monomer co-polymerizable with the a acrylic acid ester, a chain transfer agent, a free radical initiator, and a modifier moiety. The monomer premix is combined with a water phase, which contains a sufficient amount of suspending agent, to form a suspension. Polymerization occurs by mixing the premix phase with the water phase until the polymer beads are formed. The polymer beads may remain in the water prior to coating, during which time the beads are preferably storage-stable so as not to coalesce or agglomerate together. When coalescence is present, the beads tend to migrate towards one another and can form large masses. Coalescence of the beads hampers their handling and transportation and is undesirable.

U.S. Pat. No. 5,952,420 (Senkus et al.) discloses permeable, self-supporting, shaped structures that can be used in applications such as filters, masks, or respirators. The structure comprises a mass of active particulate (e.g., sorbents such as activated carbon, silica gel, or alumina granules) bonded together with pressure sensitive adhesive polymer particulates (also referred to as "PSA suspension beads") distributed in the mass of active particulate. PSA suspension beads from about 10 to 100 micrometers can be prepared using a combination of surfactants and using, as another comonomer, a styrene sulfonate salt, such as sodium salt, to control particle size in the suspension polymerization. PSA suspension beads from about 1 to 10 micrometer can be achieved by homogenizing the polymerization reaction mixture comprising (1) the styrene sulfonate salt and (2) an amount of surfactant above the critical micelle concentration added to the water phase before suspension polymerization. See Column 9, lines 39–44 and lines 57–61. Senkus also discloses that the PSA polymer is essentially any polymer, copolymer, or blend of copolymer that has pressure sensitive adhesive properties. A related case is U.S. Pat. No. 5,696,199 (Senkus et al.) The polymeric particulate and beads discussed thus far typically use added chain transfer agents. Chain transfer refers to the termination of a growing polymer chain and the start of a new one thus controlling the molecular weight of the polymer. The process can be affected by use of a chain transfer agent, which, in most cases, is some species that has been added to the polymerization process to effect chain transfer (referred to as an "added chain transfer agent"). Chain transfer agents are used widely in polymerization processing to decrease the molecular weight of the polymer thereby imparting to the polymer one of the features necessary for pressure sensitive tack. In suspension polymerization, chain transfer agents are typically added to the oil phase, which contains the monomers. When the monomers are acrylate esters of a non-tertiary alcohol having 1 to 14 carbon atoms, common chain transfer agents include mercaptans, alcohols, and carbon tetrabromide, with isooctyl thioglycolate being a preferred one. See U.S. Pat. No. 4,833,179, Column 4, lines 37–42. The beads discussed thus far typically possess room temperature tackiness and thus are well suited as a pressure sensitive adhesive.

To control the beads' particle size, surfactants in a certain amount, surfactants in combination with another comonomer, and homogenization techniques have been used. Homogenization, which generally refers to reducing a material to particles and dispersing the particles throughout a liquid, can be achieved by using the appropriate agitation. Typically, for laboratory size batches (i.e., on the order of a few liters), a Waring™ blender is used for homogenization. It is well known in the suspension polymerization art that agitation can be important to achieving the desired particle-size distribution in the final product.

While the foregoing methods of aqueous suspension polymerization and the resulting acrylate pressure sensitive adhesive beads have been proven useful, other suspension polymerization methods and compositions therefrom are sought.

SUMMARY

This invention provides a novel method of making ionomeric particulate compositions where the method does not rely on the use of an added chain transfer agent to control the molecular weight of the resulting particulate. Because the inventive method does not use an added chain transfer agent, the resulting particles tend to have high molecular weight and also tend to have little to no pressure sensitive tack. The inventive method produces ionomeric particulates that can readily act as a reinforcing agent for and thereby strengthening a polymer matrix. Also, the invention does not rely on the practice of homogenization to control the particle size. Instead, the ionomeric particulates' particle size can be controlled through the use of surfactants, one of which is a monomer surfactant.

In brief summary, the method of making an ionomeric particulate of the invention comprises or consists essentially of: (a) forming an aqueous phase comprising an acid monomer, a metal oxide, and at least a first and a second surfactant, the first being a monomer surfactant; (b) forming an oil phase comprising at least one vinyl monomer; and (c) suspension polymerizing the oil phase.

The present inventive method provides novel ionomeric particulates that can be dispersed into a polymer matrix to modify the rheology, functionality, and physical properties (e.g., cohesive strength, adhesion, toughness, elasticity, flexibility) of the polymer matrix so as to yield a useful organic particulate-filled adhesive. A key advantage of the present invention lies in the ability to tailor the ionomeric particulate so that when combined with a polymer matrix, the resulting organic particulate-filled adhesive exhibits the desired properties.

The ionomeric particulates can be used to modify any polymer matrix that is compatible with it to yield an organic particulate-filled adhesive useful for a variety of diverse applications. The adhesive can be formulated to have pressure sensitive adhesive properties by choosing the appropriate ionomeric particulate composition polymer matrix, and various other components, such as plasticizers and tackifiers.

For example, it has been discovered that the inventive ionomeric particulates are useful as part of a repulpable adhesive. Repulpability requires that the adhesive components be water-soluble or water-dispersible. When the components are water-dispersible, they are preferably of a sufficiently small particle size to pass through the repulping equipments. The inventive ionomeric particulates are also useful as a part of an adhesive that is applied to mammalian skin to remove undesirable materials (e.g., comedomes, unwanted hair follicles, dirt, oil, debris, dead skin). These particular adhesives (repulpable and skin cleansing) are disclosed in Assignee's copending U.S. application Ser. No. 09/441,580, which is hereby incorporated by reference, the application being filed on the same day as this application.

The present invention provides several processing advantages for controlling the ionomeric particulate properties, such as molecular weight and average diameter. First, there is no reliance on the use of an added chain transfer agent for controlling molecular weight. Second, the inventive method eliminates a homogenization step as a means of controlling the particle size. Homogenization on a production size scale, i.e. for batch size on the order of a few hundred pounds or higher, can and usually do require specialized equipment and often careful monitoring of the process. Elimination of the homogenization step is a processing advantage that not only provides a user-friendly process but also reduces costs in labor and machinery.

Another advantage of the present invention is the ability to make an ionomeric particulate that has little to no acid functional groups. The ionomeric particulate, however, still has a surface that is rich in inorganic salt groups attached to a polymer chain. This type of tailoring can be achieved by using a sufficient amount of a metal oxide to nearly fully neutralize the acid monomer. In some applications, it is desirable to have an organic particulate-filled adhesive that has little to no acid functional groups.

Yet another advantage of the present invention involves the post addition of dimethylaminoethyl methacrylate (DMAEMA) during a second stage of suspension polymerization, as further described below. Applicants have discovered that when DMAEMA is added during the suspension polymerization process, the particulates coalesce into an unworkable state. Surprisingly, however, adding DMAEMA during the second stage of suspension polymerization does not cause the particulates to coalesce. A related case is Assignee's copending U.S. application Ser. No. 09/441,566, which is hereby incorporated by reference, the application being filed on the same day as this application.

Definitions

As used herein,

"Organic particulate-filled adhesive," sometimes referred to as "adhesive" for convenience, refers to an adhesive system having ionomeric particulate dispersed in a polymer matrix so as to modify the physical properties of the matrix.

"Ionomeric particulate" means a polymer particle (typically in spherical form), having an oleophilic rich core and a surface that is rich in inorganic salt groups (such as zinc salt) attached to a polymer chain.

"Monomer surfactant" acts as a surfactant in that it aids in the initial formation of the polymer bead during suspension polymerization but it is believed that at least a portion of the surfactant polymerizes and becomes a part of the ionomeric particulate. Also, at least a portion of the surfactant polymerizes in the water phase.

"Pressure sensitive adhesive" means the adhesive has properties that include sufficient inherent tack, sufficient loss modulus, and sufficiently low glass transition temperature, to enable it to form a firm bond with a substrate upon contact under light pressure, e.g. finger pressure, at the temperature of use, e.g. room temperature of about 23° C. (73° F.).

DETAILED DESCRIPTION OF THE INVENTION

The ionomeric particulates are typically made by suspension polymerizing an oil phase in a water phase (often referred to as the "dispersion medium"). Bulk polymerization can be carried out in suspended droplets. Typically, it is desirable to keep the droplets from coalescing as they proceed from a liquid to a solid state by using various techniques, such as using suspending agents and surfactants. The oil phase, which is insoluble in water, typically contains the vinyl monomer and an initiator. The water phase typically contains deionized water, acid monomer, metal oxide, surfactants, and optionally polyacrylamide, and suspending agents.

The inventive method yields ionomeric particulate having an average diameter of about 1 to 200 micrometers, more preferably about 1 to 100 micrometers, and most preferably about 1 to 10 micrometers. The ionomeric particulates are stable in the aqueous solution. If desired, however, the particulates can be collected, dried, and stored as described in U.S. Pat. No. 4,952,650 (Young et al.).

Unlike U.S. Pat. No. 5,952,420 (Senkus et al.), the inventive method produces ionomeric particulates that have minimal to almost no pressure sensitive tack. As used herein, "pressure sensitive tack" describes the properties that enable an adhesive to form a bond with the surface of another material upon brief contact under light pressure, as defined by ASTM D 2979-71 (1980). Also, under ASTM D 907-82 (1985) "pressure sensitive tack" requires that the bond established be of measurable strength. Both ASTM references are hereby incorporated by reference.

The vinyl monomers is preferably present in an amount of at least 80 parts, more preferably about 85 to 95 parts, based on 100 parts total monomer content. Vinyl monomers can be straight chain, branched, or cyclic. One class of vinyl monomers useful in the present invention include monofunctional unsaturated acrylate ester monomers, of which a preferred class includes acrylic acid ester of non-tertiary alcohol having 1 to 14 carbon atoms. Included within the preferred class of acrylate monomers are, e.g., isooctyl acrylate (IOA), isononyl acrylate, 2-ethylhexyl acrylate, decyl acrylate, dodecyl acrylate, n-butyl acrylate, hexyl acrylate, hydroxyethyl acrylate (HEA), hydroxyethyl methacrylate (HEMA), and combinations thereof. Other preferred vinyl monomers include vinyl acetate, styrene, octylacrylamide, and N-vinyl lactams such as N-vinyl pyrrolidone and N-vinyl caprolactam. These latter vinyl monomers can be used in combination with the above described acrylate monomers.

The initiator is preferably present in an amount of about 0.05 to 1 part based on 100 parts total monomer weight. Useful initiators for polymerizing the vinyl monomers include those suitable for free-radical polymerization of the vinyl monomers. The initiators are preferably oil-soluble and have low solubility in water. Illustrative examples of useful initiators include organic peroxides such as benzoyl peroxide, lauryl peroxide, and various thermal initiators such as 2,2'-azobisisobutyronitrile. A preferred thermal initiator is 2,2'-azobis(2-methylbutyronitrile), commercially available from E. I. Du Pont de Nemours and Company, Wilmington, Del., under the trade name VAZO™ 67.

The acid monomer is preferably present in an amount up to about 20 parts based on the total monomer content. Acid monomers useful in for this invention preferably contain a carboxylic acid group. Acid monomers useful for the practice of this invention include acrylic acid, methacrylic acid, itaconic acid, maleic acid, fumaric acid, and citraconic acid. Preferred acid monomers include acrylic acid and methacrylic acid.

At most, the metal oxide is present in an amount necessary to fully neutralize the acid functionality of the acid monomer. For example, in one inventive composition, the metal oxide is zinc oxide and the acid monomer is methacrylic acid. To have "fully neutralize" particulates require up to one (1) mole of zinc oxide per two (2) moles of methacrylic acid.

A fully neutralized ionomeric particulate can be used to tailor the interaction between the particulates and the polymer matrix when making an organic particulate-filled adhesive. Also, in some applications, a fully neutralized ionomeric particulate is used as a component in an organic particulate-filled adhesive that desirably has little to no interaction with the substrate to which the adhesive is applied. This situation is particularly important if the substrate contains acid sensitive groups on its surface. If, on the other hand, the organic particulate-filled adhesive contains ionomeric particulate that has acid functional groups, there may be some interaction between the adhesive and the substrate containing acid sensitive groups. This interaction could result in leaving residual adhesive on the substrate, an undesirable result when clean removal of the adhesive is a desired feature.

In some applications, the ionomeric particulate can have acid functionality, which arises when the acid monomer is not fully neutralized. Thus, the metal oxide can be used to tailor the functionality of the ionomeric particulate. One skilled in the art should take care in selecting a suitable polymer matrix when making the organic particulate-filled adhesive given the different functionality of the ionomeric particulate. In other words, a polymer matrix suitable for a fully neutralized ionomeric particulate may not be suitable when the ionomeric particulate contains acid functionality.

Although zinc oxide (ZnO) is preferred, other useful metal oxides include calcium oxide (CaO), and magnesium oxide (MgO). It is believed that the metal oxides react with the acid monomer to form metal ionic salts of acid monomer.

Surfactants are preferably present in an amount of about 3 to 10 parts based on the total monomer content. There are at least two types of surfactants that are useful in this invention. The first type can be referred to as a monomeric surfactant. The second type can be referred to as conventional surfactants, which include those selected from the group consisting of non-ionic surfactant, anionic surfactant, and mixtures thereof.

Examples of the monomer surfactant include sodium styrene sulfonate. Monomer surfactants not only function like conventional surfactants in suspension polymerization by aiding in the formation of suspension beads and minimizing coalescence of the beads, but it is believed that at least a portion of the surfactant can polymerize and become a part of the ionomeric particulate. Because monomer surfactants can be polymerized, there may be little residue of these surfactants in the aqueous phase. In this respect, monomer surfactants differ from conventional surfactants.

Useful conventional surfactants that are non-ionic have a HLB (Hydrophilic-Lipophilic Balance) from about 1 to 15. The HLB number describes the balance of the size and strength of the hydrophilic (water-loving or polar) groups and lipophilic (oil-loving or non-polar) groups of the surfactant. Illustrative useful non-ionic surfactants include (1) polyethers, e.g., ethylene oxide and propylene oxide condensates, which include straight and branched $C_2$ to $C_{18}$ alkyl, alkylaryl, and alkenyl alcohol based copolymers of ethylene oxide and propylene oxide, such as those from Union Carbide Company, Danbury, Conn., under the trademarked TERGITOL series, (2) block copolymers of ethylene oxide and propylene oxide, such as those available from BASF Company, Mt. Olive, N.J., under the trademarked PLURONIC and TETRONIC. Other suitable non-ionic surfactants are the TWEEN and SPANS, trademarked compositions from ICI Inc., which are polyoxyalkylene derivatives of sorbitan and fatty acid esters.

Useful conventional surfactants that are anionic include sulfates or sulfonates, such as sodium alkylaryl sulfonates and poly(alkyleneoxy) sulfates or sulfonates. A preferred sodium alkylaryl sulfonate is sodium dodecylbenzene sulfonate, which is commercially available from Rhone-Poulenc as Rodacal™ DS-10. The poly(alkyleneoxy) compounds are ethylene oxide and propylene oxide or ethylene oxide and butylene oxide condensates, which include straight and branched $C_2$ to $C_{18}$ alkyl, alkylaryl, and alkenyl alcohol based copolymers of ethylene oxide and propylene oxide or ethylene oxide and butylene oxide. This anionic surfactant is available from BASF under the trademark MAZON SAM™ 211, which is an alkylene polyalkoxy sulfate.

Suspending agents are preferably present in an amount of about 0.005 to 5 parts based on the total monomer content. In general, these agents are used in suspension polymerization to minimize coalescence of the particles. They can be minimally water-soluble inorganic salts, such as tribasic calcium phosphate, calcium carbonate, calcium sulfate, barium sulfate, barium phosphate, hydrophilic silicas, and magnesium carbonate. A preferred inorganic suspending agent is colloidal silica, such as Nalco™ 1042, available from Nalco Chemical Company.

In some embodiments, the inventive ionomeric particulate contains dimethylaminoethy methacrylate (DMAEMA). The presence of the DMAEMA becomes beneficial when amino functionality is desired. Because amino groups are basic in nature, ionomeric particulates containing them could be useful for certain substrates. The advantages discussed earlier for having a fully neutralized ionomeric particulate would apply here.

When used, the DMAEMA is preferably present in an amount of about 0.01 to 30 parts based on the total monomer content. The method of making an ionomeric particulates containing DMAEMA requires a two-step suspension polymerization process. In the first step, the oil phase and water phase are allowed to polymerize to form stable particles. Preferably, the suspended oil droplets are about 60% polymerized before starting the second step, which involves the addition of DMAEMA.

EXAMPLES

The following examples further illustrate various specific features, advantages, and other details of the invention. The particular materials and amounts recited in these examples, as well as other conditions and details, should not be construed in a manner that would unduly limit the scope of this invention.

In each run, the suspension polymerization reaction was carried out in a 2-liter split-flask equipped with a condenser, thermometer, nitrogen inlet, motor-driven agitator, and a heating mantle with temperature control. The reaction flask was first charged with the ingredients of the water phase listed in the respective Tables and heated to 58° C. The water phase was maintained at this temperature with agitation and nitrogen-purging for about 1 hour to remove oxygen from the flask. Afterwards, a premixed charge of the oil phase, listed in the respective Tables, was added to the flask while vigorous agitation (700 rpm) was maintained to obtain a good suspension. The ensuing suspension polymerization reaction was continued with nitrogen purging. After exotherm, the reaction was continued at 75° C. for about another 2 hours, and then the reaction mixture was cooled to room temperature. The approximate volume average particle size of the resulting ionomeric particulate is given. The resulting ionomeric particulate was stored in the water phase.

Examples 1 to 3

Examples 1 to 3, the components of which are listed in Table 1, show the various acrylate ester monomer of a non-tertiary alcohol having 1 to 14 carbon atoms that can be used to make ionomeric particulate composition. The volume average diameter of the resulting particulate were less than about 10 micrometers ($\mu$m).

TABLE 1

| | EXAMPLES | | |
|---|---|---|---|
| Ingredients, grams: | 1 | 2 | 3 |
| Water phase: | | | |
| Water (deionized) | 600 | 600 | 600 |
| Methacrylic acid | 20 | 20 | 20 |
| Zinc oxide | 2 | 2 | 2 |
| Colloidal silica[a] | 2 | 2 | 2 |
| Sodium styrene sulfonate | 20 | 20 | 20 |
| Sodium dodecylbenzene sulfonate[b] | 4.3 | 4.3 | 4.3 |
| Oil Phase: | | | |
| Isooctyl acrylate | 380 | 0 | 0 |
| 2-ethylhexyl acrylate | 0 | 380 | 190 |
| Butyl acrylate | 0 | 0 | 190 |
| 2,2'-Azobis(2-methylbutyronitrile)[c] | 1.6 | 1.6 | 1.6 |
| Volume average particle size, $\mu$m | 8 | 6 | 6 |

[a]Nalco ™ 1042 colloidal silica, from Nalco Chemical Company, Naperville, IL
[b]Rodacal DS-10 surfactant, from Rhone-Poulenc, Cranbury, NJ
[c]Vazo ™ 67 initiator, from du Pont de Nemours and Company, Wilmington, DE Examples 4 to 10

Examples 4 to 10, the components of which are listed in Table 2 below, showed ionomeric particulates made at various zinc oxide concentrations. Also, MgO, a metal oxide, was used (Example 10). In most cases, the volume average diameter of the resulting particulate were less than about 10 micrometers ($\mu$m).

TABLE 2

| | EXAMPLES | | | | | | |
|---|---|---|---|---|---|---|---|
| Ingredients, grams: | 4 | 5 | 6 | 7 | 8 | 9 | 10 |
| Water phase: | | | | | | | |
| Water (deionized) | 310 | 610 | 610 | 600 | 600 | 600 | 600 |
| Methacrylic acid | 25 | 25 | 25 | 20 | 20 | 20 | 20 |
| Zinc oxide | 10.0 | 7.5 | 5.0 | 2.0 | 1.0 | 0.5 | 0 |
| Magnesium oxide | 0 | 0 | 0 | 0 | 0 | 0 | 1.0 |
| Colloidal silica[a] | 0 | 0 | 0 | 2 | 2 | 2 | 2 |
| Sodium styrene sulfonate | 25 | 25 | 25 | 20 | 20 | 20 | 20 |
| Sodium dodecylbenzene sulfonate[b] | 3.23 | 3.23 | 3.23 | 4.4 | 4.4 | 4.4 | 4.4 |
| Oil Phase: | | | | | | | |
| Isooctyl acrylate | 0 | 0 | 0 | 380 | 380 | 380 | 380 |
| 2-ethylhexyl acrylate | 475 | 475 | 475 | 0 | 0 | 0 | 0 |
| 2,2'-azobis(2-methylbutyronitrile)[c] | 2.0 | 2.0 | 2.0 | 1.6 | 1.6 | 1.6 | 1.6 |
| Volume average particle size, $\mu$m | 9.5 | 6.7 | 5.0 | 8 | 6 | 6 | >25 |

[a]Nalco ™ 1042 colloidal silica from Nalco Chemical Company, Naperville, IL
[b]Rodacal DS-10, from Rhone-Poulenc, Cranbury, NJ
[c]Vazo ™ 67 initiator, from duPont de Nemours and Company, Wilmington, DE Examples 11 to 15

Examples 11 to 15, the components of which are listed in Table 3 below, showed ionomeric particulates made with various vinyl and acrylate monomers. Example 16 showed a fully neutralized ionomeric particulate composition, i.e., the amount of zinc oxide used was in a sufficient amount so as to nearly fully neutralize the acid monomer.

TABLE 3

| | EXAMPLES | | | | |
|---|---|---|---|---|---|
| Ingredients, grams: | 11 | 12 | 13 | 14 | 15 |
| Water phase: | | | | | |
| Water (deionized) | 610 | 610 | 610 | 610 | 576 |
| Methacrylic acid | 25 | 25 | 25 | 25 | 4 |
| Zinc oxide | 2.5 | 2.5 | 2.5 | 5.0 | 1.9 |
| Colloidal silica[a] | 2.5 | 2.5 | 2.5 | 0 | 0 |
| Sodium styrene sulfonate | 25 | 25 | 25 | 25 | 19.2 |
| Sodium dodecylbenzene sulfonate[b] | 5.38 | 5.38 | 0 | 0 | 4.2 |
| Alkylene polyalkoxy sulfate[c] | 0 | 0 | 2.2 | 2.2 | 0 |
| Oil Phase: | | | | | |
| Styrene | 0 | 0 | 0 | 0 | 300 |
| 2-ethylhexyl acrylate | 470 | 470 | 442.5 | 444 | 0 |
| Vinyl acetate | 0 | 0 | 30 | 30 | 0 |
| Hydroxyethyl methacrylate | 20 | 5 | 0 | 1.25 | 0 |
| Hydroxyethyl acrylate | 0 | 0 | 2.5 | 0 | 0 |
| 2,2'-azobis-(2-methylbutyronitrile)[d] | 2.0 | 2.0 | 2.0 | 2.0 | 1.5 |
| Volume average particle size, $\mu$m | 3.8 | 7.0 | 7.0 | 31/222[e] | 0.5/2.3[e] |

[a]Nalco ™ 1042 colloidal silica, from Nalco Chemical Company, Naperville, IL
[b]Rodacal ™ DS-10 from Rhone-Poulenc, Cranbury, NJ
[c]Mazon SAM ™ 211, from BASF, Mt. Olive, NJ
[d]Vazo ™ 67 initiator, from du Pont de Nemours and Company, Wilmington, DE
[e]bimodal distribution Example 16

This example showed a two-step suspension polymerization method of making ionomeric particulates having DMAEMA. The first step was carried out as follows. A 2-liter split-flask was equipped with a condenser, thermometer, nitrogen inlet, motor-driven agitator, and a heating mantle with temperature control. The reaction flask was charged with the ingredients of the water phase containing: about 610 grams of deionized water, about 4.7 grams of methacrylic acid, about 2.5 grams of zinc oxide, about 2.5 grams of Nalco™ 1042 collodial silica, about 25 grams of sodium styrene sulfonate, and about 3.23 grams of sodium dodecylbenzene sulfonate (Rodocal™ DS-10). The water phase was heated to about 59° C. The water phase was maintained at this temperature with agitation and nitrogen-purging for about 1 hour to remove oxygen from the flask.

Afterwards, a premixed charge of the oil phase was added to the flask while vigorous agitation (700 rpm) was maintained to obtain a good suspension. The oil phase contained about 490 grams of 2-ethylhexyl acrylate and about 2 grams of Vazo™ 67 initiator. The ensuing suspension polymerization reaction was continued with nitrogen purging.

The second step of the suspension polymerization was carried out as follows. After one hour at about 59° C. and one hour at about 70° C., about 10 grams of a mixture of 50:50 weight ratio of DMAEMA and deionized water was added to the flask during 40 minutes. Mixing was continued. After an-additional hour at 70° C., the reaction was considered complete and the resulting ionomeric particulates contained DMAEMA.

All references cited above, including patents discussed in the Background, are incorporated by reference in their entirety into this document.

The present invention may be suitably practiced in the absence of any element or item not specifically described in this document.

What is claimed is:

1. A method of making an ionomeric particulate composition comprising
   (a) forming an aqueous phase comprising at least one acid monomer containing a carboxylic acid, at least one metal oxide, and at least a first surfactant and a second surfactant, the first surfactant being a monomer surfactant that aids in the initial formation of the ionomeric particulate and at least a portion of the first surfactant polynmerizes to become a part of the ionomeric particulate;
   (b) forming an oil phase comprising at least one initiator and at least one vinyl monomer selected from the group consisting of acrylic acid ester of non-tertiary alcohol having 1 to 14 carbon atoms, vinyl acetate, styrene, octylacrylamide, and N-vinyl lactams; and
   (c) suspension polymerizing oil phase wherein the particulates do not have pressure sensitive tack.

2. The method of claim 1, wherein the acid monomer is partially neutralized by the metal oxide.

3. The method of claim 1, wherein the acid monomer is fully neutralized by the metal oxide.

4. The method of claim 1, wherein the metal oxide is selected from the group consisting of ZnO, MgO, and CaO.

5. The method of claim 1, wherein the acrylic acid ester of non-tertiary alcohol having 1 to 14 carbon atoms is selected from the group consisting of isooctyl acrylate, isononyl acrylate, 2-ethylhexyl acrylate, decyl acrylate, dodecyl acrylate, n-butyl acrylate, hexyl acrylate, octylacrylamide, hydroxyethyl acrylate, hydroxyetlhyl methacrylate, and combinations thereof.

6. The method of claim 1, wherein the acid monomer is selected from the group consisting of acrylic acid, methacrylic acid, itaconic acid, maleic acid, fumaric acid, citraconic acid, and combinations thereof.

7. The method of claim 1, wherein the second surfactant is selected from the group of non-ionic, anionic surfactants, and combinations thereof.

8. The method of claim 7, wherein the anionic surfactant is selected from the group consisting of sodium alkylaryl sulfonate, poly(alkyleneoxy) sulfate, and poly(alkyleneoxy) sulfonates.

9. The method of claim 8, wherein the sodium alkylaryl sulfonate is sodium dodecylbenzene sulfonate.

10. The method of claim 1, wherein the monomer surfactant is sodium styrene sulfonate.

11. The method of claim 1, wherein the particulate has an average diameter of about 1 to 100 micrometers.

12. The method of claim 1, wherein the particulate has an average diameter of about 1 to 50 micrometers.

13. The method of claim 1, wherein the particulate has an average diameter of about 1 to 10 micrometers.

14. A method of making an ionomeric particulate composition comprising the steps of:
   (a) forming an aqueous phase comprising at least one acid monomer containing a carboxylic acid, at least one metal oxide, and at least a first surfactant and a second surfactant, the first surfactant being a monomer surfactant that aids in the initial formation of the ionomeric particulate and at least a portion of the first surfactant polymerizes to become a part of the ionomeric particulate;
   (b) forming an oil phase comprising at least one initiator and at least one vinyl monomer selected from the group consisting of acrylic acid ester of non-tertiary alcohol having 1 to 14 carbon atoms, vinyl acetate, styrene, octylacrylamide, and N-vinyl lactams;
   (c) suspension polymerizing oil phase until the suspended oil droplets are about 60% polymerized; then
   (d) adding dimethylaminoethyl methacrylate; and
   (e) suspension polymerizing the oil phase to near completion.

* * * * *

UNITED STATES PATENT AND TRADEMARK OFFICE
CERTIFICATE OF CORRECTION

PATENT NO. : 6,620,874 B1
DATED : September 16, 2003
INVENTOR(S) : Young, Chung I.

It is certified that error appears in the above-identified patent and that said Letters Patent is hereby corrected as shown below:

Title Page,
Item [75], Inventors, delete "Chung I. Young, . . . Tseng, P.O. Box 33427, St. Paul, MN (US) 55133-3427" insert in place thereof -- Chung I. Young, Roseville, MN (US); Michael R. Engel, Maplewood, MN (US); Chi-Ming Tseng, Woodbury, MN (US) --.

Column 1,
Line 22, delete "a" following "the".
Line 56, "The polymeric particulate and" should be a new paragraph.

Column 2,
Line 66, delete "composition" and insert in place thereof -- composition, --.

Column 4,
Line 38, delete "is" and insert in place thereof -- are --.

Column 5,
Line 3, delete "for" following "in".
Line 13, delete "neutralize" and insert in place thereof -- neutralized --.

Column 6,
Line 8, delete "drademarked" and insert in place thereof -- trademarks --
Line 37, delete "dimethylaminoethy" and insert in place thereof -- dimethylaminoethyl --.
Line 47, delete "an" following "making".

Column 7.
Line 66, insert "sulfonate" following "styrene".

Column 8.
Line 7, delete "sulfonate".
Table 3, Example 13, Line 52, delete "7.0" and insert in place thereof -- 70 --.

Column 9,
Line 7, delete "(Rodocal$^{TM}$" and insert in place thereof -- (Rodacal$^{TM}$ --.
Line 23, delete "an-additional" and insert in place thereof -- an additional --.
Line 41, delete "polynmerizes" and insert in place thereof -- polymerizes --.

UNITED STATES PATENT AND TRADEMARK OFFICE
CERTIFICATE OF CORRECTION

PATENT NO.    : 6,620,874 B1
DATED         : September 16, 2003
INVENTOR(S)   : Young, Chung I.

It is certified that error appears in the above-identified patent and that said Letters Patent is hereby corrected as shown below:

Column 10,
Line 8, delete "hydroxyetlhyl" and insert in place thereof -- hydroxyethyl --.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,620,874 B1
DATED : August 29, 2005
INVENTOR(S) : Young et al.

It is certified that error appears in the above-identified patent and that said Letters Patent is hereby corrected as shown below:

Title page,
Item [73], Assignee, should read -- 3M Innovative Properties Company, P.O. Bx 33427, St. Paul, Mn. 55133-3427 --.

Signed and Sealed this

Fifteenth Day of November, 2005

JON W. DUDAS
*Director of the United States Patent and Trademark Office*